US006970934B2

(12) United States Patent
Remer et al.

(10) Patent No.: US 6,970,934 B2
(45) Date of Patent: *Nov. 29, 2005

(54) SYSTEM AND METHOD FOR CONNECTING TO A DEVICE ON A PROTECTED NETWORK

(75) Inventors: Eric B. Remer, American Fork, UT (US); David A. King, Highland, UT (US); David L. Remer, Orem, UT (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/852,799

(22) Filed: May 25, 2004

(65) Prior Publication Data

US 2004/0215967 A1  Oct. 28, 2004

Related U.S. Application Data

(63) Continuation of application No. 09/466,812, filed on Dec. 20, 1999, now Pat. No. 6,742,039.

(51) Int. Cl.⁷ ............................................. G06F 15/16
(52) U.S. Cl. ..................... 709/229; 709/238; 709/250; 713/201; 707/9
(58) Field of Search ............................... 709/200, 229, 709/238, 250; 707/9; 713/175, 201

(56) References Cited

U.S. PATENT DOCUMENTS

| 5,991,810 | A  | * | 11/1999 | Shapiro et al. | ............. | 709/229 |
|---|---|---|---|---|---|---|
| 6,163,844 | A  | * | 12/2000 | Duncan et al. | ............. | 713/201 |
| 6,343,323 | B1 | * | 1/2002  | Kalpio et al. | ............... | 709/229 |
| 6,345,303 | B1 | * | 2/2002  | Knauerhase et al. | ........ | 709/238 |
| 6,574,627 | B1 | * | 6/2003  | Bergadano et al. | ............ | 707/9 |
| 6,691,231 | B1 | * | 2/2004  | Lloyd et al. | ................ | 713/201 |
| 6,760,782 | B1 | * | 7/2004  | Swales | ....................... | 709/250 |
| 6,789,193 | B1 | * | 9/2004  | Heiden | ....................... | 713/175 |

* cited by examiner

*Primary Examiner*—Andrew Caldwell
*Assistant Examiner*—Hai V. Nguyen
(74) *Attorney, Agent, or Firm*—Pillsbury Winthrop Shaw Pittman LLP

(57) ABSTRACT

A novel system and method for connecting to an entity behind a firewall or proxy enhances network security and eliminates the costs and risks associated with modifying the firewall or proxy. The invention uses a trusted arbitrator as an intermediary between (1) a local area network protected by an access control mechanism such as a firewall or proxy and (2) external entities seeking to connect with an entity within the network. Requests from external entities are routed to the trusted arbitrator, which communicates with a connection entity located behind the firewall or proxy.

16 Claims, 6 Drawing Sheets

SYSTEM AND METHOD FOR CONNECTING TO A DEVICE ON A PROTECTED NETWORK

RELATED APPLICATIONS

This application is a continuation application of U.S. patent application Ser. No. 09/466,812, filed Dec. 20, 1999, now U.S. Pat. No. 6,742,039.

BACKGROUND OF THE INVENTION

1. Field of the Invention

The present invention is directed to connecting to a device on a network. More specifically, the present invention is directed to connecting to a device on a network that is protected by an access control mechanism.

2. Description of Related Art and General Background

A network is a system of computers that are connected to each other (and possibly to terminals and other peripheral devices) by communications lines which may be physical and/or wireless. Each computer on a network may be generally classified as a 'client' (i.e. a computer that initiates requests) or a 'server' (i.e. a computer that receives and responds to requests), although a single computer may also perform different roles at different times. Transfers of information across the network are typically conducted in compliance with one or more network protocols to ensure that the information may be properly delivered and interpreted. One such protocol is the Hypertext Transfer Protocol or HTTP, an application-level protocol that provides a basis for information transfer across the Internet and is specified e.g. in RFC 2616 ("Hypertext Transfer Protocol—HTTP/1.1"), R. Fielding et al., June 1999, which document is available at http://www.ietf.org/rfc/rfc2616.txt. As shown in FIG. 1, HTTP is a query/response protocol in which an entity such as a client 30 directs a query for information to a specific resource (such as a file or web page, as identified by a Universal Resource Locator or URL) and another entity such as a server 40 forwards an appropriate response associated with that resource.

A local area network (or 'LAN') allows computers or terminals that are located near one another to share resources such as storage devices, printers, and other peripheral equipment. A LAN that is connected to a larger network may include one or more access points (or 'gateways') through which devices within the LAN may communicate with devices outside the LAN. Access control mechanisms (or 'ACMs') provide security against unauthorized access to the LAN by controlling or restricting the flow of information across the access points. FIG. 2, for example, shows a LAN 230 that is connected to the Internet 250 only through an ACM 20a. Due to the presence of ACM 20a at this access point, a remote computer 20c that is connected to the Internet 250 may not freely interact with devices connected to LAN 230 such as computer 10a. Any request for information that is sent by remote computer 20c to computer 10a will be scrutinized by ACM 20a and may be rejected.

One type of ACM is a firewall. The term 'firewall' indicates a protective layer that separates a computer network from external network traffic, and this layer may be implemented in software, hardware, or any combination of the two. For example, firewall application software may be installed on a server to create a combination called a 'firewall server.'

Another type of ACM is a server (possibly a firewall server) running an application program that evaluates incoming requests according to a predefined set of rules. Such a device is called a 'proxy server' or simply a 'proxy.' To entities outside the network, the proxy may act as a server, receiving and evaluating incoming transmissions. To devices within the network, the proxy may act as a client, forwarding the incoming transmissions which conform to its rules. For example, the proxy may prevent executable files from entering the LAN but may pass all responses to HTTP queries that were sent by devices within the LAN.

Unfortunately, the characteristics that make firewalls or proxies effective in controlling the flow of information into the network also lead to increased complexity and cost. For example, when an entity outside the LAN, such as remote computer 20c, seeks to be connected with an entity within the LAN, such as computer 10a, complex and/or costly changes to the ACM may be necessary to permit the connection. In addition, a significant amount of processing resources must be expended to perform the task of evaluating all gateway traffic to ensure compliance with the network's security rules and thereby protect the network from potentially harmful traffic.

Some solutions to these problems of overhead—such as setting aside a dedicated, open port in the firewall through which external traffic may enter—may create unacceptable security risks. Other, more secure solutions include virtual private networks (VPNs), which use encryption to allow users on different networks to exchange information with each other in a secure manner over the Internet. This encryption effectively creates a secure "tunnel" between sender and receiver so that even though the information may pass through many other entities during transmission, it is accessible only to the sender and the receiver.

Although a VPN offers a higher level of security, no reduction in overhead processing is thereby achieved, as network traffic entering the LAN through the VPN must still pass through and be evaluated by the ACM. Adding a VPN to an existing network also involves a significant investment in resources and may introduce bugs or errors into a stable system. Furthermore, in many network installations it may not be feasible to reconfigure an existing ACM to support communication with every new external entity that may be desired, as such modifications require extensive resources and testing. To avoid these costs and risks, another approach is desired.

SUMMARY

A system and method according to an embodiment of the invention allows an external entity to communicate with a device within a network protected by an access control mechanism. The external entity sends a request directed to the device to an intermediary (hereinafter a "trusted arbitrator"). The trusted arbitrator communicates the request to a connection entity which is located within the protected network. The trusted arbitrator communicates this request to the connection entity by attaching it to a response to a request from the connection entity. The connection entity then forwards the request to the device.

DETAILED DESCRIPTION

Figure 1:
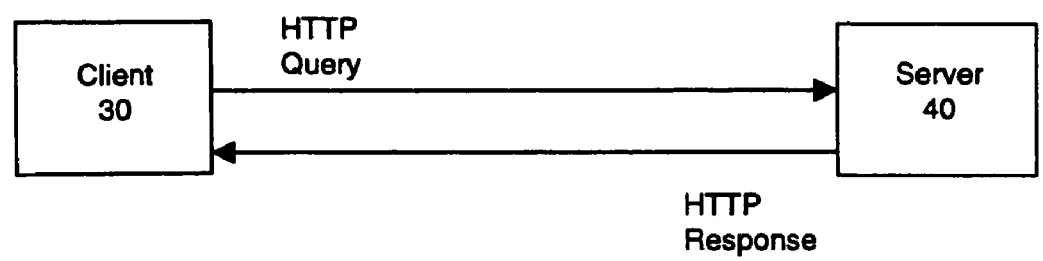
FIG. 1 illustrates the flow of data in a HTTP query and response.
Figure 2:
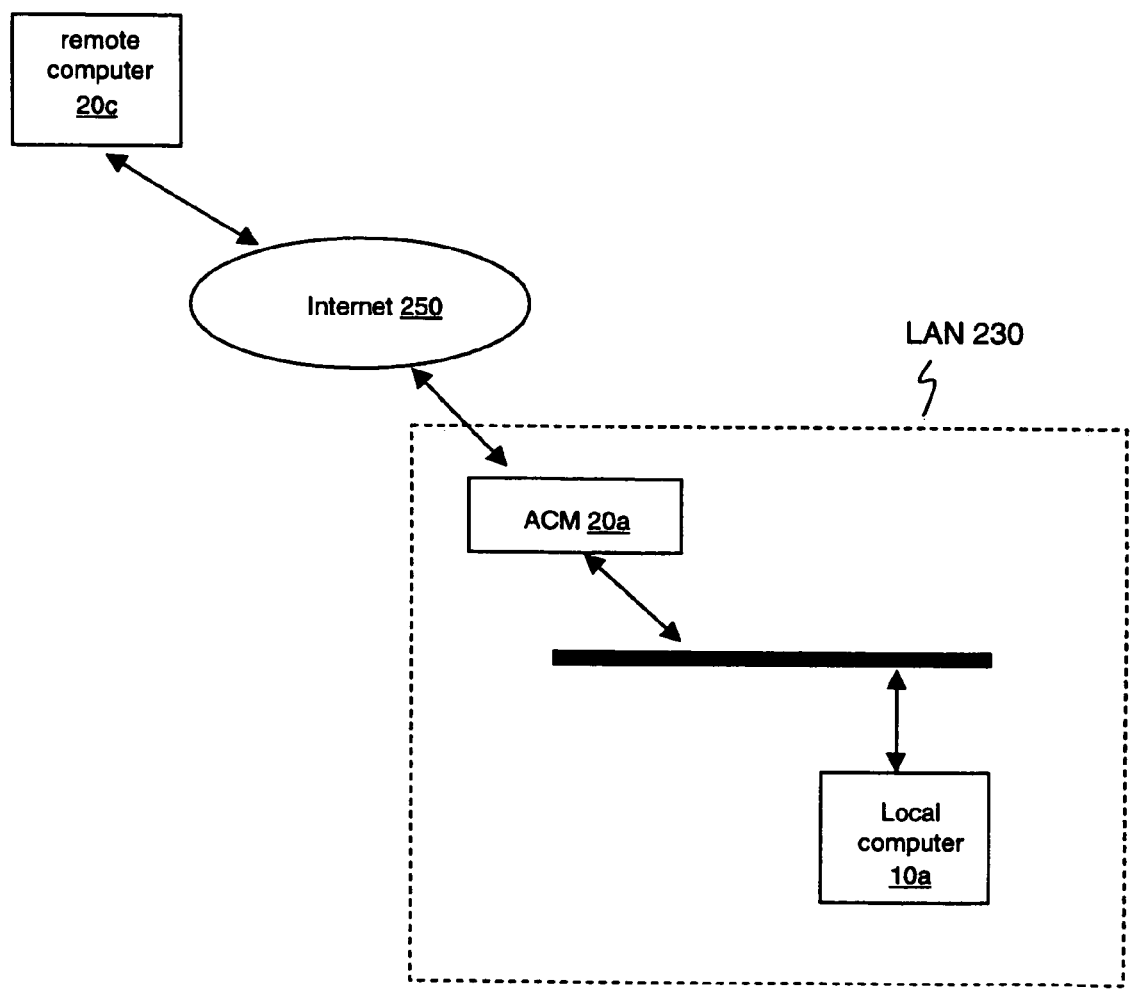
FIG. 2 shows a block diagram of a system including a local area network and a remote computer.
Figure 3:
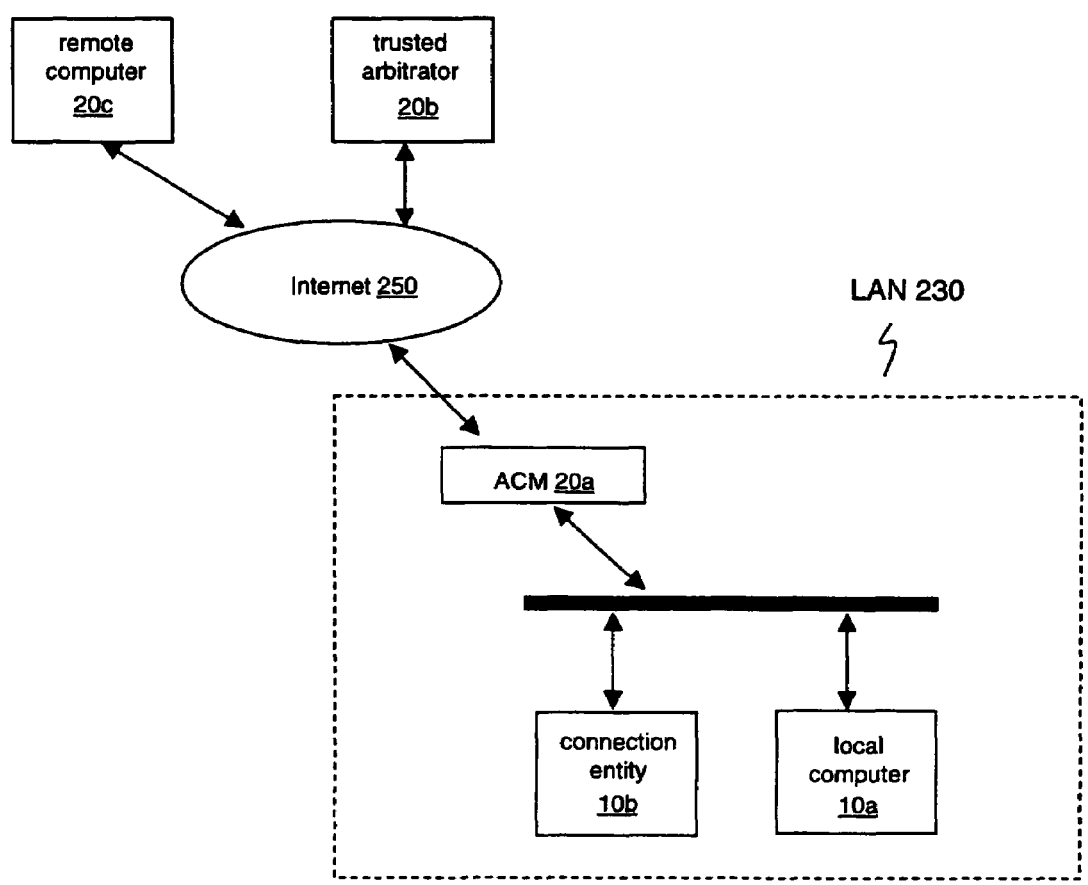
FIG. 3 shows a block diagram of a system according to an embodiment of the invention.

FIG. 3 shows an overall perspective view of a first embodiment of the invention. A remote computer 20c is connected to a network such as the Internet 250. A LAN 230 comprises various components including a local computer 10a and a connection entity 10b (discussed below). Other components such as additional computers, printers, and file servers may also be connected to LAN 230. LAN 230 is connected to the Internet 250 through ACM 20a, which protects components within LAN 230 from external network traffic by intercepting communication requests that are sent directly to these components from entities outside the network.

A trusted arbitrator 20b is also connected to the Internet 250. Subject to the restrictions dictated by ACM 20a, information may thereby flow among entities connected to LAN 230, remote computer 20c, and trusted arbitrator 20b. (The term 'entity' as used herein refers to any device or process that originates or terminates a request for information. For example, an entity may be a computer, an application program, or an embedded processor.)

One of the entities connected to LAN 230 is a connection entity 10b, which interacts with trusted arbitrator 20b regarding communication requests sent by external entities (such as remote computer 20c) to devices within LAN 230. Connection entity 10b may reside on a device such as a router, on a dedicated computer, or on a computer that performs other tasks as well (for example, ACM 20a and connection entity 10b may reside on the same entity). Regardless of the form of connection entity 10b, this device contacts trusted arbitrator 20b periodically in order to determine whether an external entity (such as remote computer 20c) has sought to communicate with an entity within LAN 230 (such as local computer 10a). If such request has been made, connection entity 10b establishes a communication link with trusted arbitrator 20b to retrieve the request. Upon retrieving the request, connection entity 10b forwards the request to the appropriate entity within LAN 230.

In this embodiment of the invention, remote computer 20c sends communication requests for local computer 10a to trusted arbitrator 20b over the Internet 250, rather than directly to local computer 10a through ACM 20a. Remote computer 20c sends these requests (e.g. in response to a user's keyboard or mouse requests, or as directed by an application program) to trusted arbitrator 20b through the arbitrator's website, which is accessed by using its Universal Resource Locator (URL). Connection entity 10b may also exchange information with trusted arbitrator 20b through this or another URL associated with the trusted arbitrator.

Before remote computer 20c is permitted to communicate with an entity within LAN 230, trusted arbitrator 20b performs a certification process in order to establish the validity of the request sent by remote computer 20c. In one implementation, trusted arbitrator 20b certifies the request by verifying the identity of remote computer 20c. By virtue of such a certification process, an impostor may not assume the identity of remote computer 20c without running afoul of trusted arbitrator 20b. In another implementation, trusted arbitrator 20b assigns an authentication identity to remote computer 20c upon certification. In a further implementation, trusted arbitrator 20b certifies the request by verifying that remote computer 20c is capable of transmitting and receiving information in a secure manner.

Before a first request is made by trusted arbitrator 20b to connection entity 10b, a basis for identification of trusted arbitrator 20b by connection entity 10b (or, alternatively, a basis for identification of connection entity 10b by trusted arbitrator 20b) is also established. Connection entity 10b may initiate the identification process by selecting trusted arbitrator 20b as its intermediary for all requests directed to entities within LAN 230. In one embodiment, connection entity 10b connects to trusted arbitrator 20b through the trusted arbitrator's website, exchanging information with trusted arbitrator 20b that will allow the two entities to continue to communicate with each other in the future. For example, trusted arbitrator 20b may provide connection entity 10b with an authentication identity that connection entity 10b can use in future communication with trusted arbitrator 20b.

Thus, in order to request communication with an entity within LAN 230 such as local computer 10a, remote computer 20c transmits a request through a network such as the Internet 250 to trusted arbitrator 20b. In one implementation, remote computer 20c makes this request by contacting trusted arbitrator 20b through its website and thereby supplying the trusted arbitrator with information about the request: for example, the identity or location of LAN 230, the nature of the request, and the particular entity within the LAN to which the request is directed.

Figure 4:
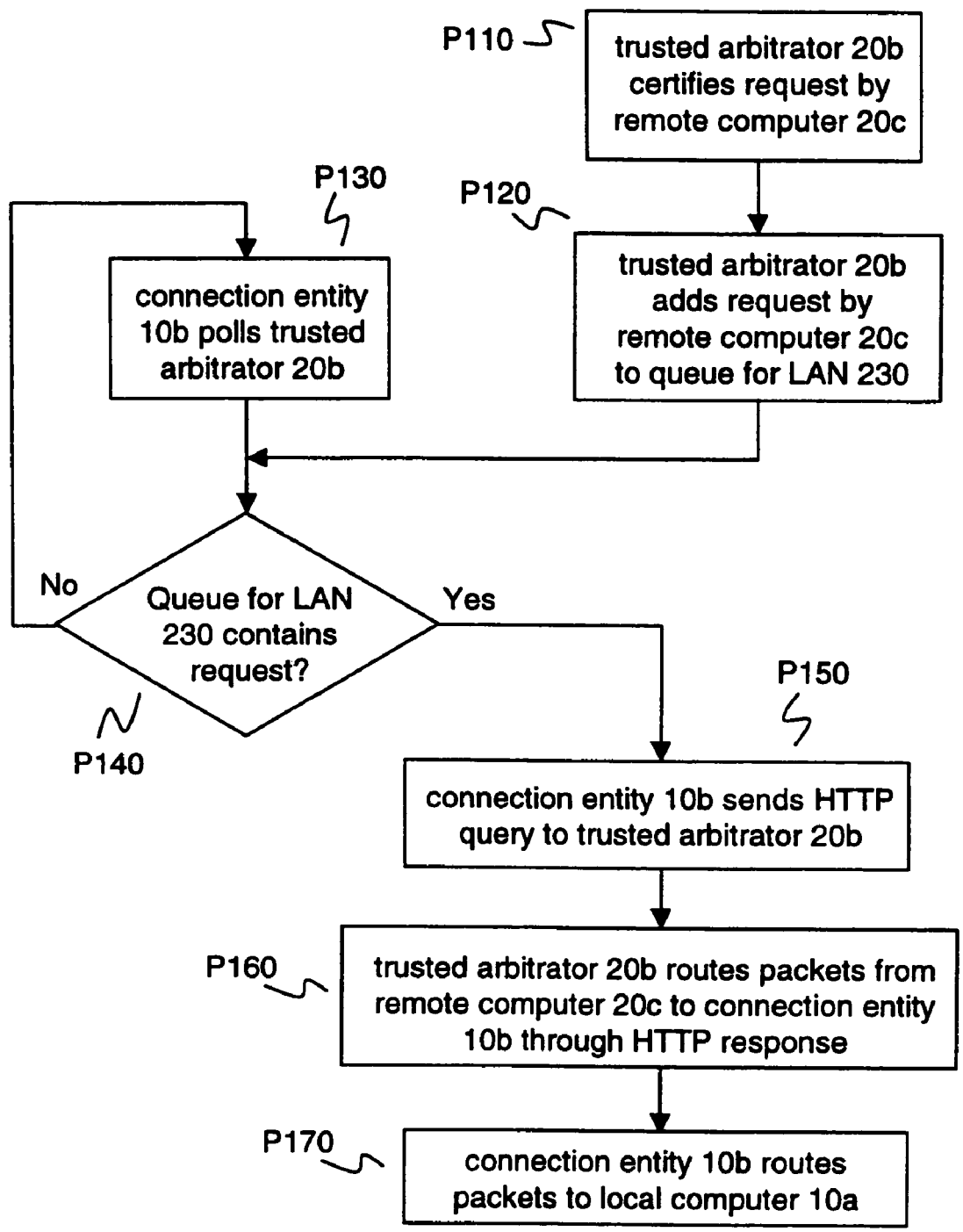
FIG. 4 shows a flow chart for a method according to an embodiment of the invention.

FIG. 4 illustrates the flow of data in a system according to an embodiment of the invention. In block P110, upon receiving a request from remote computer 20c, trusted arbitrator 20b certifies a request by remote computer 20c by, for example, verifying the identity of remote computer 20c. In one implementation, trusted arbitrator 20b certifies the request by verifying identification information which remote computer 20c forwards along with the request. If the certification is successful, then trusted arbitrator 20b processes the request; otherwise, trusted arbitrator 20b rejects the request.

If trusted arbitrator 20b determines that it has received a valid request from remote computer 20c, then in block P120 trusted arbitrator 20b organizes the request for forwarding to connection entity 10b. In this implementation, trusted arbitrator 20b adds the request to a queue in a secure area within its website that may be designated for connection entity 10b (i.e. for LAN 230).

As shown in block P130, connection entity 10b regularly polls trusted arbitrator 20b to determine whether any requests directed to devices within LAN 230 are currently stored. In this embodiment, connection entity polls trusted arbitrator 20b by sending a HTTP query to its website. If no response indicating the presence of requests is received, connection entity 10b waits for a predetermined delay period before polling trusted arbitrator 20b again.

If trusted arbitrator 20b indicates that requests for devices within LAN 230 are currently present, then these requests are forwarded to connection entity 10b. In this implementation, for example, connection entity 10b sends a HTTP query to trusted arbitrator 20b (block P150) to open a HTTP pipe between the two entities. Trusted arbitrator 20b then forwards the request to connection entity 10b in the form of packets attached to the HTTP response to that query (block P160). Because this HTTP response is associated with a HTTP query that connection entity 10b initiated, it passes through ACM 20a without being evaluated. In addition, because the HTTP response originated from an entity that is trusted by connection entity 10b, connection entity 10b is assured that the HTTP response is secure. As indicated in block P170, connection entity 10b routes the information within the HTTP response to the appropriate device within LAN 230 (e.g. as indicated within the response). If the response indicates that the information relates to records that are located on a storage medium of local computer 10a, for example, connection entity 10b routes the information to local computer 10a for processing.

In one exemplary use, remote computer 20c may wish to send a HTTP query to local computer 10a. Because remote computer 20c is not known to ACM 20a, a query sent by remote computer 20a directly to local computer 10a will not reach its destination. If the query is sent as a payload to a HTTP query by trusted arbitrator 20b as described above, however, then it will be admitted by ACM 20a and forwarded to local computer 20a as desired by connection entity 10b. Thus the overhead of configuring the system to allow direct secure communication with remote computer 20c is avoided without compromising the security of LAN 230.

Figure 5:
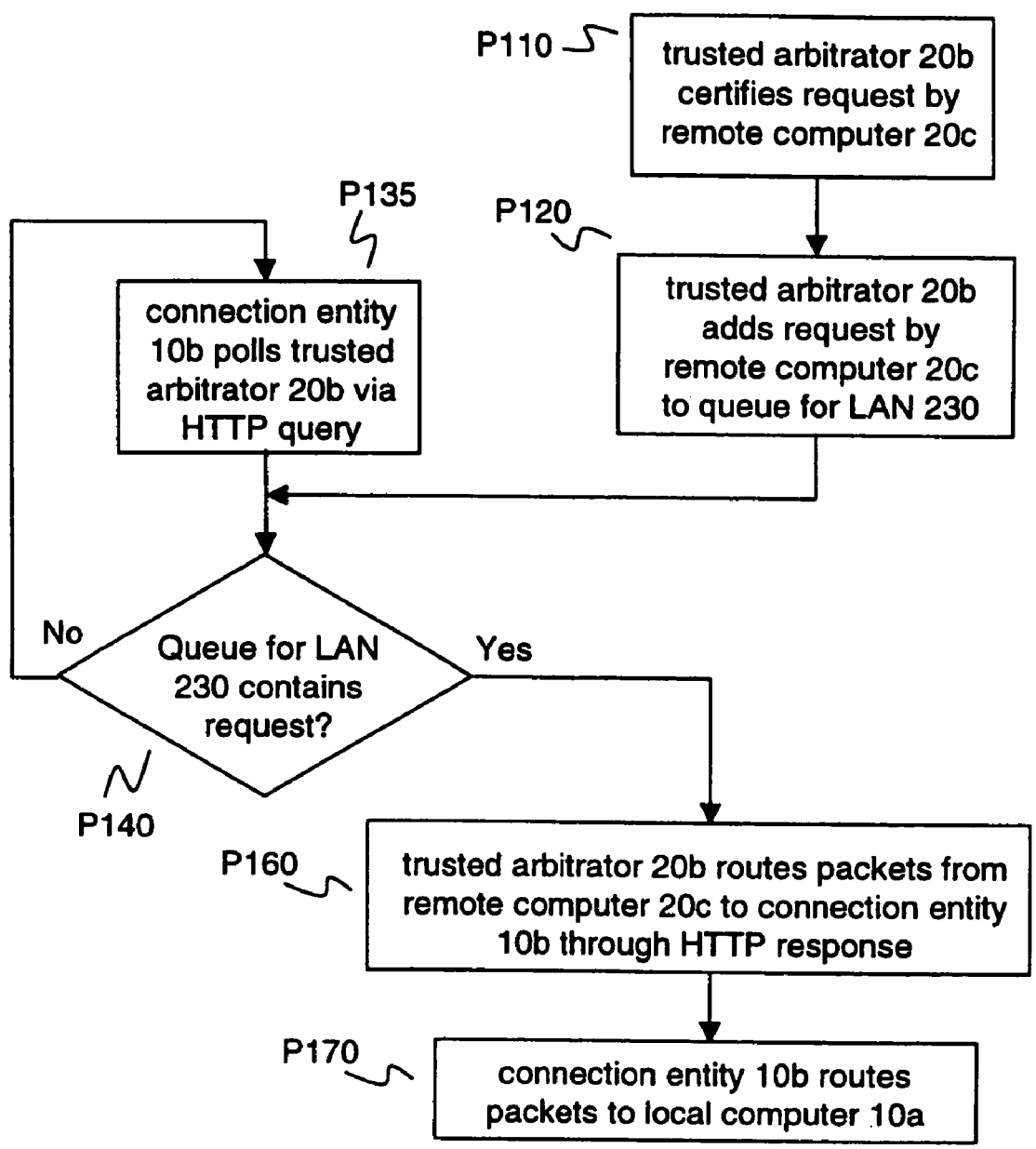
FIG. 5 shows a flow chart for a method according to another embodiment of the invention.

In an alternative embodiment as shown in FIG. 5, connection entity 10b polls trusted arbitrator explicitly via a HTTP query (block P135). If the queue is empty, no response need be sent. If the queue contains pending requests for devices within LAN 230, then these requests are forwarded back to connection entity 10b immediately in a HTTP response to that query.

Figure 6:
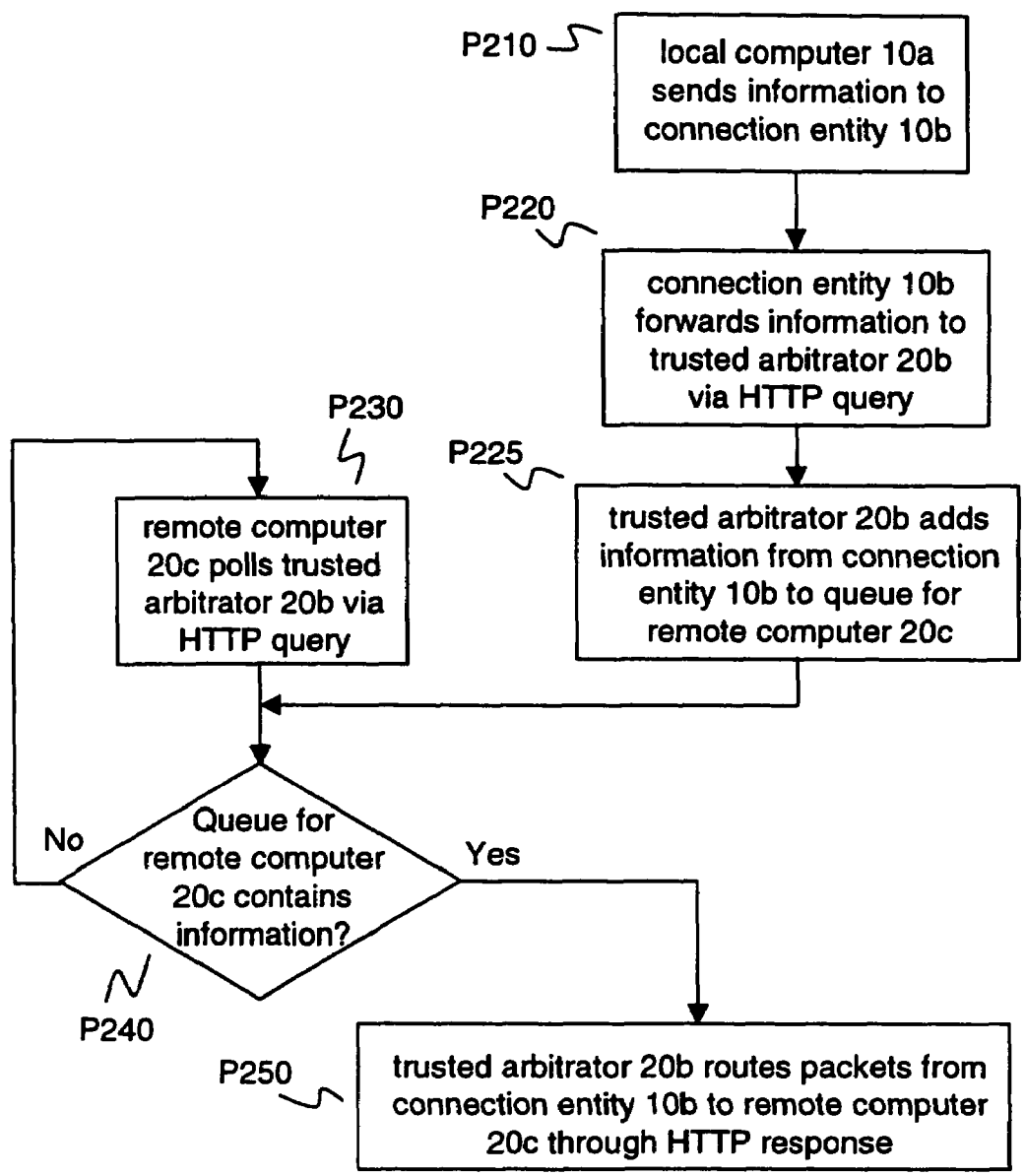
FIG. 6 shows a flow chart for an extension of a method according to an embodiment of the invention.

As shown in FIG. 6, any response to the incoming information that is subsequently generated by the target device (in this case, local computer 10a) may be forwarded back to remote computer 20c in an analogous fashion. In block P210, local computer 10a sends the response information to connection entity 10b. In block P220, connection entity 10b forwards this information to trusted arbitrator 20b via, e.g., a HTTP query. Trusted arbitrator 20b extracts the information destined for remote computer 20c and stores it in a secure area within its website. Trusted arbitrator 20b may also acknowledge receipt of the query in a HTTP response to connection entity 10b.

After sending its request as described above, remote computer 20c polls trusted arbitrator 20b periodically in order to determine whether a response is available. In block P230 of the implementation shown in FIG. 6, for example, polling is performed via HTTP queries. If a response has been received from local computer 10a through connection entity 10b (block P240), then the information is forwarded to remote computer 20c. In this example (block P250), the information is sent in a HTTP response to the polling query. Alternatively, remote computer 20c may open a HTTP pipe to trusted arbitrator 20b only after trusted arbitrator 20b has indicated that a response to the request of remote computer 20c is available.

As described above, a method or apparatus according to an embodiment of the invention allows a secure connection to be established with an entity outside a LAN without changing the infrastructure of the LAN and while reducing monitoring costs. In one implementation, this connection is supported by communication through a trusted third-party website, thereby minimizing the risk of damage to the LAN due to breaches by unauthorized entities.

The foregoing description is provided to enable any person skilled in the art to make or use the present invention. Various modifications to these embodiments are possible, and the generic principles presented herein may also be applied to other embodiments. For example, an embodiment of the invention may use a connection entity that is implemented as any combination of (1) hardware such as a computer or a device for processing network traffic such as a router, (2) firmware loaded into non-volatile storage, and/or (3) software loaded into random-access memory in the form of machine-readable code, such code being executable by an array of logic elements such as a microprocessor or other digital signal processing unit. The connection entity may also reside on a dedicated computer or may be simply one among several tasks executing on one computer. Thus, the present invention is not intended to be limited to the embodiments shown above, but rather, is to be accorded the widest scope consistent with the principles and novel features disclosed in any fashion herein.

We claim:

1. A system, comprising:
    a local area network, said local area network including
        a local entity,
        a connection entity coupled to the local entity, and
        an access control mechanism coupled to the connection entity;
    a remote entity; and
    a trusted arbitrator, coupled to the access control mechanism and to the remote entity via a wide area network, to receive a first request which is sent by the remote entity across the wide area network and being directed at least in part to the local entity on the local area network,
    wherein the connection entity regularly polls the trusted arbitrator via the access control mechanism across the wide area network to determine whether any requests directed to devices on the local area network are pending in the trusted arbitrator, the trusted arbitrator sends a first response via the wide area network to the connection entity on the local area network, the first response including the first request from the remote entity and being in response to polling by the connection entity, and the connection entity forwards at least a portion of the first request to the local entity.

2. The system according to claim 1, wherein the first request is a query that conforms at least substantially to a Hypertext Transfer Protocol.

3. The system according to claim 1, wherein the first response is a response that conforms at least substantially to a Hypertext Transfer Protocol.

4. The system according to claim 1, wherein the access control mechanism is a firewall.

5. The system according to claim 1, wherein the access control mechanism is a proxy server.

6. The system according to claim 1, wherein the access control mechanism is coupled to the trusted arbitrator at least in part through the Internet.

7. The system according to claim 1, wherein the remote entity is coupled to the trusted arbitrator at least in part through the Internet.

8. The system according to claim 1, wherein if the connection entity does not receive the first response within a predetermined period of a time of the sending of the first request, the sending of the first request is repeated.

9. A method, comprising:
    receiving a first request at a trusted arbitrator from a remote entity, the first request being directed to a local entity;
    storing the first request on the trusted arbitrator, the first request being sent by the remote entity across a wide area network to the trusted arbitrator and being directed at least in part to a local entity on a local area network;

receiving regular polling, from a connection entity on the local area network, to determine whether any requests directed to devices on the local area network are pending in the trusted arbitrator; and sending a first response from the trusted arbitrator across the wide area network to the connection entity on the local area network, the first response including a first request from the remote entity and being in response to polling of the connection entity, wherein the connection entity forwards at least a portion of the first request from the connection entity to the local entity.

10. The method according to claim 9, the method further comprising certifying the first request, said certifying being completed prior to a time of sending the first response.

11. The method according to claim 9, wherein the first request is stored in an area associated with the connection entity.

12. The method according to claim 9, wherein sending a first response from the trusted arbitrator to a connection entity comprises passing the first response through an access control mechanism.

13. A data storage medium having machine-readable code stored thereon, the machine-readable code comprising instructions executable by logic elements, the instructions defining a method comprising:

storing a first request on a trusted arbitrator, the first request being sent by a remote entity across a wide area network to the trusted arbitrator and being directed at least in part to a local entity on a local area network;

receiving regular polling, from a connection entity on the local area network, to determine whether any requests directed to devices on the local area network are pending in the trusted arbitrator; and sending a first response from the trusted arbitrator across the wide area network to the connection entity on the local area network, the first response including the first request from the remote entity and being in response to polling by the connection entity, wherein the connection entity forwards at least a portion of the first requst from the connection entity to the local entity.

14. The medium according to claim 13, the method further comprising certifying the first request, said certifying being completed prior to a time of sending the first response.

15. The medium according to claim 13, wherein the first request is stored in an area associated with the connection entity.

16. The medium according to claim 13, wherein sending a first response from the trusted arbitrator to a connection entity comprises passing the first response through an access control mechanism.

* * * * *